United States Patent
Himmelmann (10) Patent No.: US 8,610,323 B2
(45) Date of Patent: Dec. 17, 2013

(54) BEARINGLESS MACHINE

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 253 days.

(21) Appl. No.: 13/021,201

(22) Filed: Feb. 4, 2011

(65) Prior Publication Data

US 2012/0200183 A1   Aug. 9, 2012

(51) Int. Cl.
| | |
|---|---|
| H02K 5/00 | (2006.01) |
| H02K 5/15 | (2006.01) |
| H02K 5/24 | (2006.01) |
| H02K 1/18 | (2006.01) |

(52) U.S. Cl.
CPC .. *H02K 5/00* (2013.01); *H02K 5/15* (2013.01); *H02K 5/24* (2013.01); *H02K 1/187* (2013.01)
USPC ............. 310/91; 310/54; 310/89; 310/90; 310/90.5

(58) Field of Classification Search
CPC ........... H02K 5/00; H02K 5/24; H02K 1/187; H02K 5/15
USPC ................................ 310/54, 89, 90, 90.5, 91
See application file for complete search history.

(56) References Cited

U.S. PATENT DOCUMENTS

| | | | |
|---|---|---|---|
| 4,702,681 A * | 10/1987 | Inaba et al. ................. | 418/55.6 |
| 5,962,941 A | 10/1999 | Serdar, Jr. et al. | |
| 6,100,618 A | 8/2000 | Schoeb et al. | |
| 6,204,577 B1 | 3/2001 | Chottiner et al. | |
| 6,253,437 B1 | 7/2001 | Levin | |
| 6,777,837 B2 | 8/2004 | Tsuzuki et al. | |
| 6,842,967 B2 | 1/2005 | Wingeier | |
| 7,229,474 B2 | 6/2007 | Hoffmann et al. | |
| 7,723,895 B2 | 5/2010 | Poskie et al. | |
| 2003/0214193 A1 * | 11/2003 | Aiello et al. ................. | 310/90.5 |
| 2004/0107703 A1 | 6/2004 | Gustafson | |
| 2009/0022571 A1 * | 1/2009 | Krupyshev et al. ........... | 414/217 |
| 2009/0243413 A1 * | 10/2009 | Gilchrist et al. ............. | 310/90.5 |
| 2010/0194228 A1 * | 8/2010 | Lee et al. ................. | 310/156.53 |
| 2012/0200183 A1 * | 8/2012 | Himmelmann ................. | 310/89 |

* cited by examiner

*Primary Examiner* — John K Kim
(74) *Attorney, Agent, or Firm* — Kinney & Lange, P.A.

(57) ABSTRACT

A rotating machine comprises a stationary subassembly, a rotating subassembly, and a first circumferential track. The stationary subassembly includes a plurality of stator elements disposed proximate an inner circumference of a portion of the stationary subassembly, and a casing having a first portal. The rotating subassembly includes a plurality of rotor elements disposed proximate an outer circumference of a portion of the rotating subassembly. The rotating subassembly is aligned coaxially within the stationary subassembly and is rotatable relative to the stationary subassembly without the aid of support bearings. The first circumferential track is defined by a first rotor track portion on the rotating subassembly and a first stator track portion on the stationary subassembly, and is in communication with a first portal on the casing.

19 Claims, 10 Drawing Sheets

BEARINGLESS MACHINE

BACKGROUND

This invention relates generally to bearingless machines, and more specifically to an apparatus and method for assembling, storing, and transporting bearingless machines.

Bearingless machines, including Permanent Magnet ("PM") motors and generators have been in use for many years. They have been favored over other types of electric machines for their efficiency, simplicity, robustness, and their tolerance to large radial air gaps between the rotor and the stator. As is well known, the simplest forms of PM motor/generators include an inner rotor assembly rotating concentrically within an outer stator assembly. The rotor assembly has one or more permanent magnets with poles disposed diametrically about a rotor shaft. As the magnet(s) are rotated by motive power connected to the shaft, the rotating magnetic fields generate an electrical current in one or more adjacent winding circuits disposed circumferentially around the outer stator assembly. Similarly, currents induced in the winding circuits induce magnetic fields that can cause rotation of the shaft. A gearbox, such as a planetary gearset or other mechanical transmission can be used to efficiently transfer rotational energy to and from the shaft depending on the operating mode of the vehicle or other machine.

It is often desirable in manufacturing and logistics to provide complete modular components or systems as they move along the supply chain to improve efficiency during the various stages of assembly. Transportation of these components is also helpful when these components or systems are compact with a minimum amount of air or empty space being moved. For example, a bearingless machine can be transported from a supplier to the next node in the manufacturing network with the rotating and stationary subassemblies as separate entities. At the very least, this is a waste of valuable shipping space given that the rotating subassembly is sized to fit within the stationary subassembly. However, one or both subassemblies can be damaged without some way of keeping the rotor element(s) separate from the stator elements.

SUMMARY

A rotating machine comprises a stationary subassembly, a rotating subassembly, and a first circumferential track. The stationary subassembly includes a plurality of stator elements disposed proximate an inner circumference of a portion of the stationary subassembly, and a casing having a first portal. The rotating subassembly includes a plurality of rotor elements disposed proximate an outer circumference of a portion of the rotating subassembly. The rotating subassembly is aligned coaxially within the stationary subassembly and is rotatable relative to the stationary subassembly without the aid of support bearings. The first circumferential track is defined by a first rotor track portion on the rotating subassembly and a first stator track portion on the stationary subassembly, and is in communication with a first portal on the casing.

A driveline for a motor vehicle includes a prime mover and a bearingless rotating machine coupled to a gearbox. The rotating machine comprises a stationary subassembly, a rotating subassembly, and a first circumferential track. The stationary subassembly includes a casing and a plurality of stator elements disposed proximate an inner circumference of a portion of the casing with a first portal. The rotating subassembly includes a plurality of rotor elements disposed proximate an outer circumference of a portion of the rotating subassembly, and is aligned coaxially within the stationary subassembly. The rotating subassembly is rotatable relative to the stationary subassembly without the aid of bearings. The first circumferential track is defined by a first rotor track portion on the rotating subassembly and a first stator track portion on the stationary subassembly, and is in communication with a first portal on the casing.

A method for integrating a bearingless machine into a driveline is disclosed. The method comprises providing a rotating subassembly with a first circumferential rotor track portion, providing a stationary subassembly with a casing having a first portal and a first circumferential stator track portion. The method also comprises a step of coaxially aligning the subassemblies such that the first circumferential track portion and the second circumferential track portion define a substantially complete first circumferential track in communication with the first portal. A first fixture band is inserted into the first circumferential track via the first portal to substantially maintain axial and radial alignment of the rotor subassembly relative to the stator subassembly. The rotor subassembly and the stator subassembly are secured to adjacent components of the driveline.

DETAILED DESCRIPTION

Figure 1A:
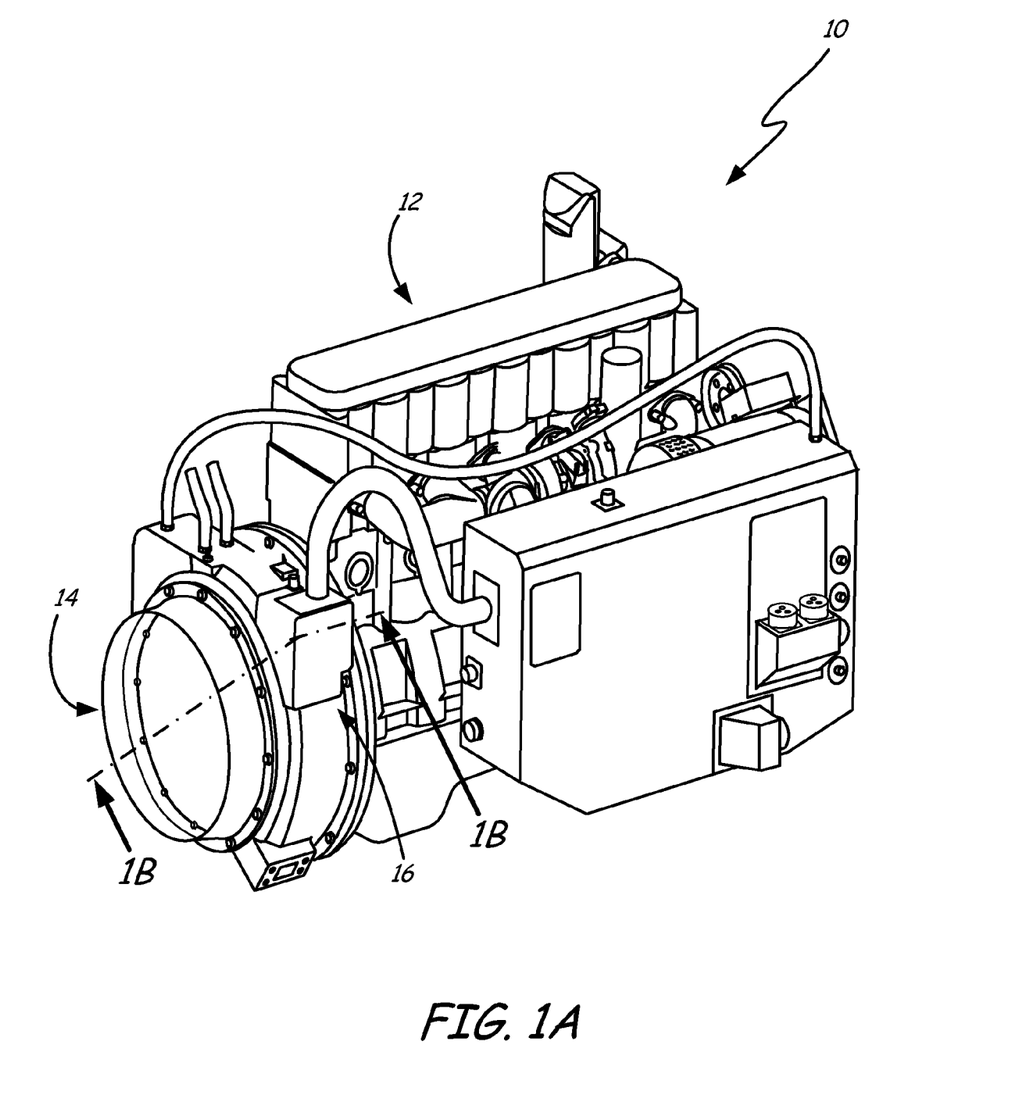
FIG. 1A schematically depicts a vehicle driveline with a permanent magnet motor/generator between a prime mover, and a gearbox.

FIG. 1A depicts driveline assembly 10 with prime mover 12, gearbox 14, and permanent magnet motor/generator 16. Driveline assembly 10 is typically installed in a motor vehicle (not shown), such as a personal automobile, a commercial transport, or a military vehicle. In one example configuration, prime mover 12 is an internal combustion engine powered by hydrocarbon-based fuels such as diesel fuel, gasoline, kerosene, or compressed natural gas. Prime mover 12 can be any motor that converts chemical energy of fuel directly into mechanical force. Power from prime mover 12 is provided to and from a plurality of wheels and/or tracks (not shown) through gearbox 14. Additional power can be provided to or from permanent magnet motor/generator 16, depending on its operating mode.

Figure 1B:
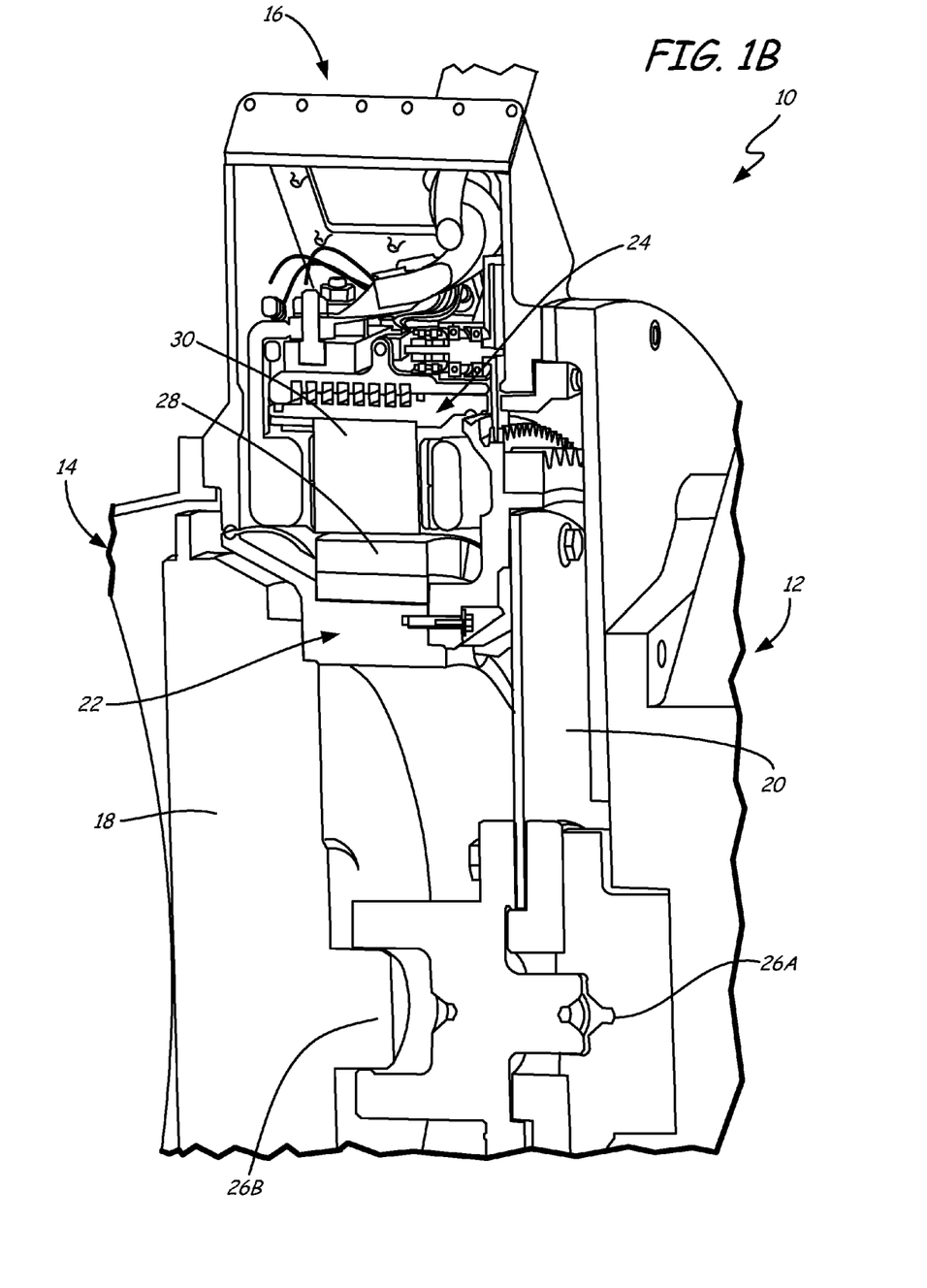
FIG. 1B is a magnified cross-section of the assembly shown in FIG. 1A with the motor/generator disposed between the prime mover and the gearbox.

Prime mover 12 and permanent magnet motor/generator 16 provide power to gearbox 14 through a shaft (shown in FIG. 1B). Gearbox 14 can be a planetary gearset, a traditional multi-gear transmission, or other similar arrangement. In this example, permanent magnet motor/generator 16 is installed between prime mover 12 and gearbox 14 and is configurable to alternately operate as a motor or a generator, depending on the operating needs of the vehicle (not shown) and the mode of operation as described above. When motor/generator 16 is in motor mode, gearbox 14 is configured to efficiently combine and convert rotational power of prime mover 12 and/or permanent magnet motor/generator 16 into vehicular motion. When motor/generator 16 is in generator mode, gearbox 14 can also be configured to convert energy from vehicle motion and/or from operation of prime mover 12 by capturing rotational energy of the transmission shaft (shown in FIG. 1B).

In recent years, the automotive industry has started to favor permanent magnet electric machines for vehicle propulsion applications. In these applications, the electric machine has been integrated into the vehicle propulsion system with the engine and the vehicle transmission. As described above, the electric machine can be integrated in a manner similar to that shown in FIGS. 1A and 1B, with motor/generator 16 disposed between prime mover 12 and gearbox 14. This example configuration can be seen in more detail in FIG. 1B.

FIG. 1B shows an enlarged cross-sectional view of driveline 10 centered around motor/generator 16. This figure includes prime mover 12, gearbox 14, motor/generator 16, transmission torque converter 18, engine flex plate 20, motor/generator rotor 22, motor/generator stator 24, engine drive shaft 26A, and transmission shaft 26B.

As was seen in FIG. 1A, motor/generator 16 is disposed between prime mover 12 and gearbox 14. Specifically in this example, motor/generator 16 is adjacent to torque converter 18 and engine flex plate 20 and rotatably connected to each via shafts 26A and 26B. Transmission torque converter 18 is a well-known device to increase the torque available, particularly at low engine and vehicle speeds. Flex plate 20 is used in many heavy-duty vehicles, including those built for industrial and military applications. Flex plate 20 allows for angular misalignment parallel to the axis of rotation between the transmission input shaft and the engine crank shaft. Flex plate 20 is generally very stiff in the rotational direction of the engine, transmitting rotational torque while allowing for deflections parallel to the axis of rotation of the engine between the engine and transmission. If the transmission shaft were bolted directly to the engine crank shaft without flex plate 20, the bolted joint would prematurely fail due to fatigue.

Permanent magnet motor/generator 16 includes rotor subassembly 22 and stator subassembly 24. Rotor subassembly 22 is coupled to prime mover 12 by engine drive shaft 26A, such as by a plurality of bolts. In this example, gearbox 14 also includes shaft 26B coupled to the opposing face of rotor subassembly 22. Shafts 26A and 26B cooperate to transfer power between prime mover 12, motor/generator 16, gearbox 14, and the drive wheels (not shown). When operating in motor mode, motor/generator 16 and gearbox 14 can be configured as a starter to start prime mover 12 and/or provide additional power to the drive wheels. In generator mode, motor/generator 16 can capture mechanical energy from prime mover 12 and/or the drive wheels (via gearbox 14) to convert into electrical power for vehicle accessories. Excess electricity generated can be sent to one or more storage devices, such as batteries and/or high-power capacitors. Motor/generator 16 is seen in detail in FIGS. 2A-2C below.

Figure 2A:
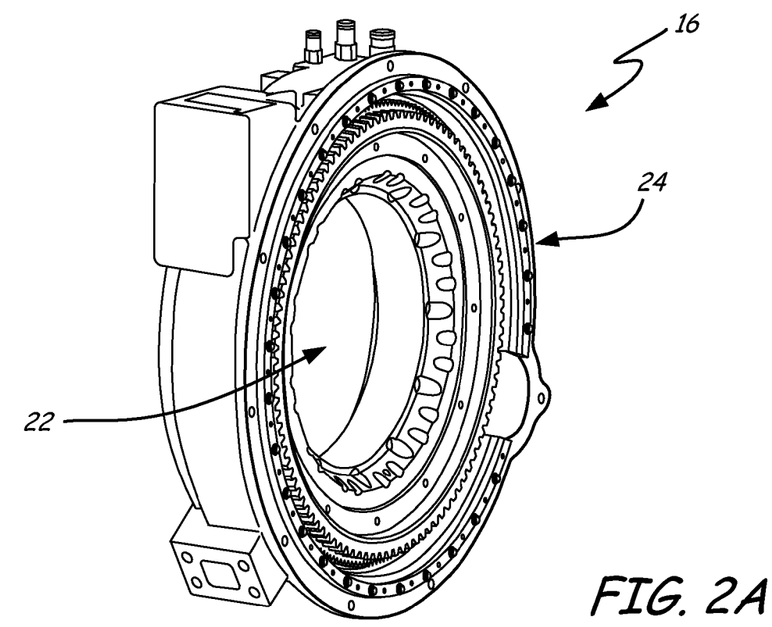
FIG. 2A shows a perspective of the permanent magnet motor/generator shown in FIGS. 1A-1B.
Figure 2B:
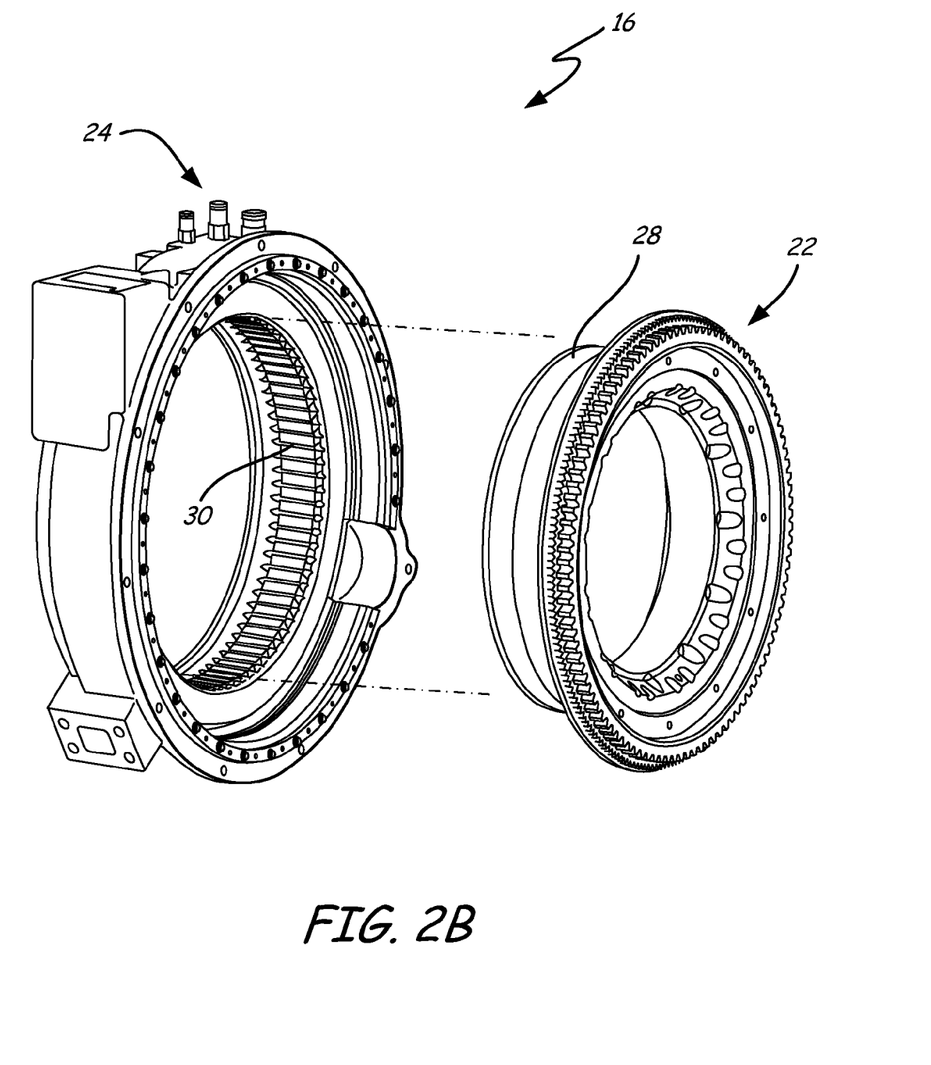
FIG. 2B is a cross-section of the permanent magnet motor/generator shown in FIG. 2A.

FIG. 2A illustrates permanent magnet motor/generator 16 with rotor subassembly 22 and stator subassembly 24. FIG. 2B shows an axial cross-section of permanent magnet motor/generator 16 with rotor subassembly 22, stator subassembly 24, permanent magnets 28, stator 30, and air gap 32.

Rotor subassembly 22 rotates within stator subassembly 24 in either a motor mode or a generator mode described above. After permanent magnet motor/generator 16 has been assembled, permanent magnets 28 are coaxially aligned with stator 30 to maximize interaction between them, thus increasing efficiency of permanent magnet motor/generator 16. In FIG. 2B, it can be seen that permanent magnets 28 are disposed around the outer periphery of rotor subassembly 22, and interact with coaxially adjacent stator 30.

Figure 2C:
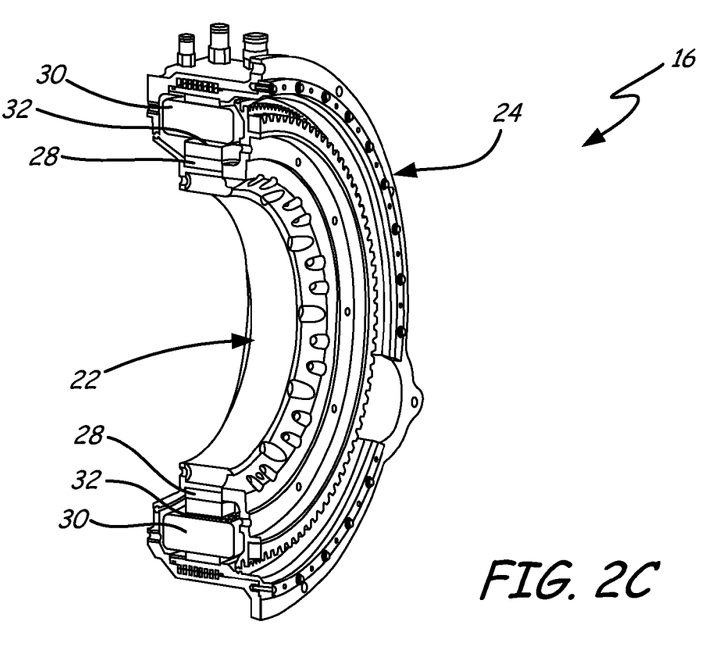
FIG. 2C is an exploded view of the permanent magnet motor/generator shown in FIG. 2A.

FIG. 2C is an exploded view of motor/generator 16 shown in FIG. 2A with rotor subassembly 22, stator subassembly 24, permanent magnets 28, and stator 30. FIG. 2C shows how motor/generator 16 is assembled, where rotor subassembly 22 is placed coaxially within stator subassembly 24 to align magnets 28 and stator 30 as described above.

The automotive industry has started to pursue the use of bearingless PM electric machines, such as motor/generator 16. Early in the evolution of integrating motor/generators into vehicle drivelines, an electric machine rotor was typically supported by its own dedicated set of rotor support bearings. In such machines, the bearings were installed between the rotor and stator subassemblies. On PM electric machines that have rotor support bearings, the rotor is supported by assembly fixtures until the bearings are installed. Once the bearings are installed, they axially and radially support the rotor in its proper location.

It was found that these rotor support bearings were the least reliable components of a PM electric machine. Thus, bearingless machines are more frequently used to increase the reliability of the electric machine, while also decreasing its cost and complexity. However, bearingless permanent magnet motor/generators can be difficult to store, install, and transport, particularly when the electric machine is to be placed within the driveline rather than at one end.

During assembly of PM electric machines, such as motor/generator 16, forces generated between permanent magnets 28 and stator 30 must be accounted for and reacted during assembly, storage, and transportation. For example, as rotor subassembly 22 and stator subassembly 24 are brought axially together, as shown in FIG. 2C, magnets 28 on rotor subassembly 22 are magnetically drawn radially toward stator 30. This magnetic force can exceed several hundred pounds. Since permanent magnet motor/generator 16 does not have inherent fixtures like bearings, undesired contact and damage is likely due to the magnetic attraction between magnets 28 and stator 30. Similar damage can occur in these and other bearingless machines due simply to vibrations and sudden movements experienced during transport and installation.

Ordinarily during assembly of motor/generator 16 and during integration into driveline 10 (shown in FIG. 1A), an assembly fixture (not shown) is utilized to react these magnetic forces and move rotor subassembly 22 into place coaxial with stator subassembly 24. This fixture supports and maintains separation of the subassemblies until other fixtures or devices can be used. For example, when motor/generator 16 is first assembled, it is likely to be stored or transported before final integration into a vehicle driveline. Storage and transportation of motor/generator 16 is most space-efficient if it can be done with rotor subassembly 22 in its coaxial position relative to stator subassembly 24. Further, this support must be maintained until the rotor is fastened to engine crankshaft 26A, and/or transmission input shaft 26B (shown in FIG. 1B). The subassemblies must also be supported when the shafts are removed for any reason, such as maintenance or repair. This is to prevent misalignment and damage caused by axial or radial deflection such as from the high magnetic forces described above.

When the electric machine is located on one axial end of the driveline, a series of wedges, or a cylindrical spacer have previously been inserted between the rotor and stator subassemblies. Once the electric machine is integrated, these spacers or wedges could be removed axially without disassembling or otherwise removing components in the driveline. However, in situations where the electric machine is located between the internal combustion engine and the vehicle transmission, such as in example driveline 10 shown in FIG. 1A, there is no access to add or remove such wedges or spacers proximate air gap 32 once permanent magnet motor/generator 16 is incorporated into driveline 10.

Wedges or spacers placed around the air gap between the rotor and stator and interfere with free rotation of the rotor if left in place during operation of the electric machine. Thus it would be helpful to access the area between the rotor and stator subassemblies through the stator casing to insert and remove assembly fixtures. Assembly fixtures configured to be easily installed and removed through the stator casing would also be useful. Several example embodiments are described in detail below.

Figure 3A:
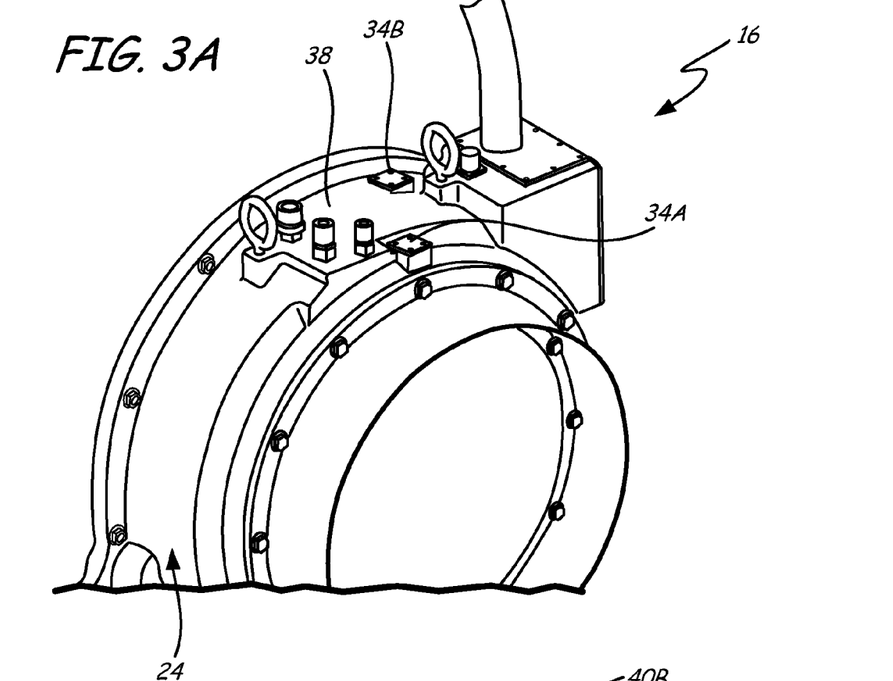
FIG. 3A shows an outer view of the permanent magnet motor/generator with two portals in the stator casing.

FIG. 3A shows a magnified view of permanent magnet motor/generator 16. Permanent magnet motor/generator 16 has stator subassembly 24 with portals 34A, 34B, orifices 36A, 36B and stator casing 38.

Portals 34A, 34B include respective orifices 36A, 36B through stator casing 38. Portals 34A, 34B with orifices 36A, 36B lead to respective internal paths (not shown in FIG. 3A) between rotor subassembly 22 and stator subassembly 24. As will be seen in FIGS. 4B, 4C, and 5A, these paths are sized to allow insertion and removal of assembly fixtures, such as correspondingly shaped fixture bands or other similar devices. As will also be seen, rotor subassembly 22 and/or stator subassembly 24 can be adapted to include one or more tracks that serve as the internal paths described above. These tracks secure the assembly fixtures during transport and integration of permanent magnet motor/generator 16 into the driveline. Examples of assembly fixtures are shown in FIGS. 3B and 5B below.

Providing access to insert and remove assembly fixtures through the stator casing greatly simplifies assembly, storage, and transportation of motor/generator 16. When rotor subassembly 22 and stator subassembly 24 are brought into coaxial alignment, the assembly fixtures can be inserted, allowing the jacking fixtures or other support structures (described above) to be removed. Because of the access provided by portals 34A, 34B, assembly fixtures can remain in place until motor/generator 16 is put into service. The assembly fixtures can remain in place even when motor/generator 16 is installed in the middle of the driveline because the assembly fixtures remain accessible via portals 34A, 34B. Assembly fixtures can also be reinstalled in portals 34A when the vehicle driveline is disassembled for service. This eliminates the need for separate supports for rotor subassembly 22 and stator subassembly 24, which reduces the equipment and number of steps needed to perform maintenance.

Figure 3B:
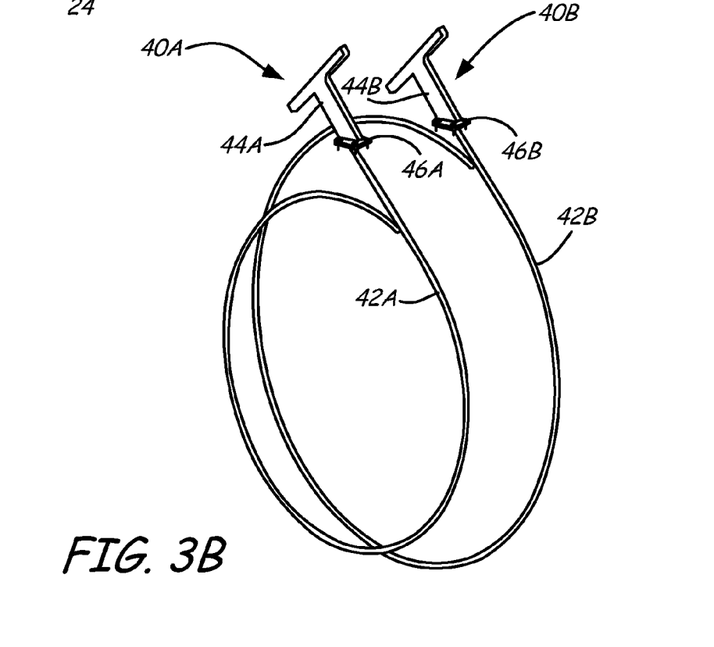
FIG. 3B shows a detailed view of two fixture bands for insertion into the portals shown in FIG. 3A.

FIG. 3B depicts a pair of example assembly fixtures. Bands 40A, 40B respectively include flexible cables 42A, 42B, handles 44A, 44B, and locking plates 46A, 46B.

Bands 40A, 40B include flexible cables 42A, 42B. Cables 42A, 42B are inserted into portals 34A, 34B via orifices 36A, 36B (shown in FIG. 3A). Flexibility of cables 42A, 42B simplifies insertion and removal of bands 40A, 40B into one or more paths around the circumference of rotor subassembly 22, as shown in detail in FIGS. 4A and 4B. Bands 40A, 40B can also include handles 44A, 44B to further facilitate insertion and removal. Locking plates 46A, 46B proximate handles 44A, 44B can be used with bolts or other attachment means to secure bands 40A, 40B to stator casing 38 around portals 34A, 34B.

In this example, flexible cables 42A, 42B are coated with polytetrafluoroethylene (commonly known as "PTFE" or "Teflon") to be easily inserted between rotor subassembly 22 and stator subassembly 24. Other examples of resilient, flexible, self-lubricating materials for cables 42A, 42B also include reinforced or unreinforced silicone resin. Alternatively, cables can be made of any nonmagnetic material and can be separately lubricated to facilitate installation and removal from between rotor subassembly 22 and stator subassembly 24.

Cables 42A, 42B are shown in this example with a uniform circular cross-section. However, it will be appreciated that other forms are possible for cables 42A, 42B. In one alternative example, shown in more detail in FIGS. 5A-5B, a single cable is shaped with a substantially uniform cross-section to fit within the fan volute of certain motor/generators with a built-in fan. In other examples, cables 42A, 42B can alternatively have non-uniform cross-sections, and be in the shape of a series of segmented spheres or cylinders which are fused or strung together. These and other alterations to the form and number of bands 40A, 40B can be made without departing from the scope and utility of the device.

As shown above with respect to FIG. 2C, once rotor subassembly 22 is coaxially aligned with stator assembly 24, a large radial magnetic force tends to pull the centerline of rotor assembly 22 off of the centerline of stator assembly 24. Fixture bands 40A, 40B are simple, inexpensive examples of assembly fixtures that can be installed through stator casing 38 via portals 34A, 34B. Once in place, bands 40A, 40B substantially fix rotor subassembly 22 relative to stator subassembly 34 in both the radial and axial directions. They can remain in place until integration into driveline 10 with prime mover 12 and gearbox 14 (shown in FIG. 1A).

Figure 4A:
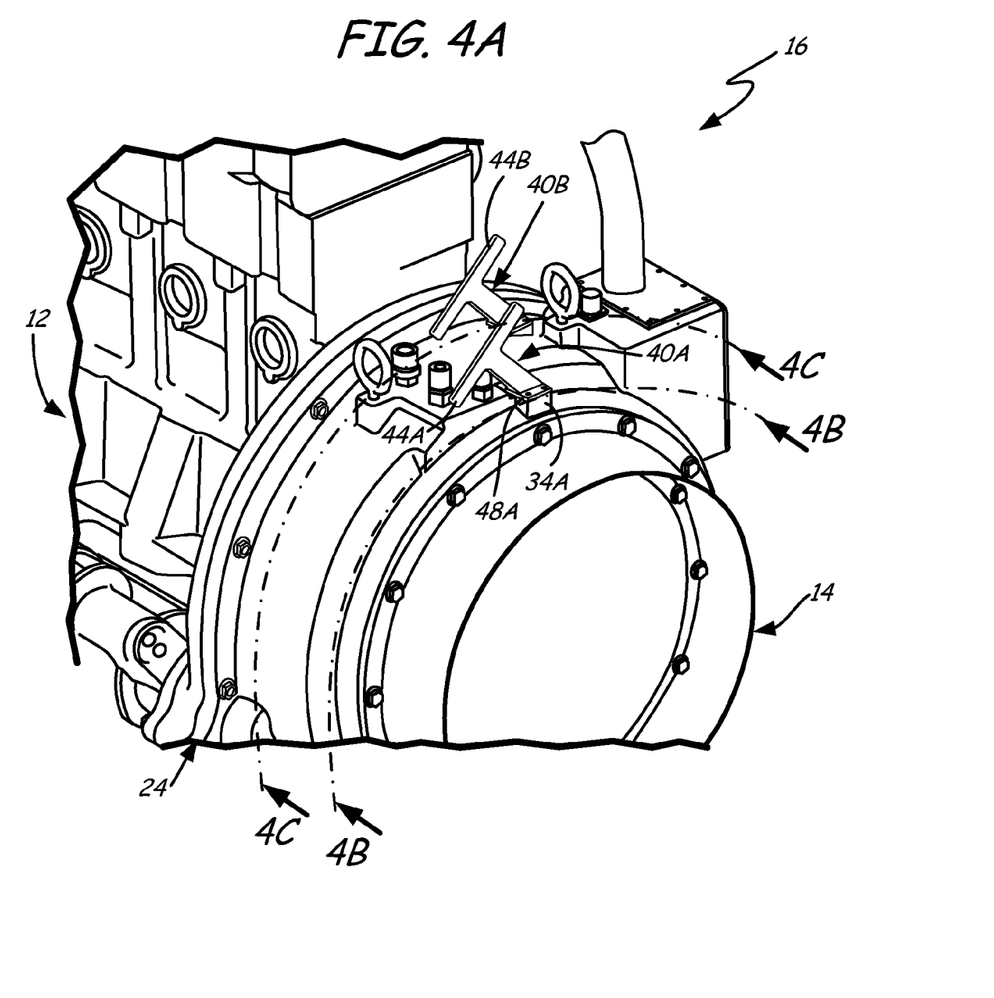
FIG. 4A depicts a driveline that includes the permanent magnet motor/generator shown in FIG. 3A incorporated into a driveline with the fixture bands of FIG. 3B installed.

FIG. 4A is a detailed view of completed driveline 10 with prime mover 12, gearbox 14, permanent magnet motor/generator 16, stator subassembly 24, portals 34A, 34B, and fixture bands 40A, 40B. Bands 40A, 40B each has respective handles 44A, 44B, plates 46A, 46B, and locking bolts 48A, 48B.

Fixture bands 40A, 40B are fed into portals 34A, 34B on stator casing 38. Once fixture bands 40A, 40B are in place, jacking fixtures are no longer needed to maintain separation of rotor subassembly 22 and stator subassembly 24. The rotor and stator can be bolted or otherwise fixed to their final assembled orientation. Bands 40A, 40B can be removed by disconnecting locking bolts 48A, 48B and pulling tangentially via handles 44A, 44B. The location of bands 40A, 40B relative to rotor subassembly 22 and stator subassembly 24 will be seen in more detail in FIGS. 4B-4D.

In this example, permanent magnet motor/generator 16 is integrated into driveline 10 by bolting stator subassembly 24 to prime mover 12 and gearbox 14. Rotor subassembly 22 is coupled to the engine crank shaft and transmission shaft (shown respectively as shafts 26A and 26B in FIG. 1B). After rotor subassembly 22 and stator subassembly 24 are secured, fixture bands 40A, 40B can be removed. This is done by disengaging bolts 48A, 48B holding plates 46A, 46B to respective portals 34A, 34B on stator casing 38. Handles 44A and 44B are then pulled in the tangential direction until cables 42A, 42B are completely out of the tracks between rotor subassembly 22 and stator subassembly 24. Once fixture bands 40A, 40B are removed, permanent magnet motor/generator 16 is no longer restricted and is ready for operation.

Bands 40A, 40B allow permanent magnet motor/generator 16 to be transported in a compact and efficient manner to the next point in the supply network. Bands 40A, 40B are inserted as described above and can be retained in place until permanent magnet motor/generator 16 is ready for final incorporation into driveline 10. Incorporation can occur at any facility so long as bands 40A, 40B are maintained in place until final assembly occurs. Bands 40A, 40B can also be reinstalled prior to maintenance or repair that requires disassembly of driveline 10. In this manner, permanent magnet motor/generator 16 can be assembled, transported, and installed without magnetic forces between the rotor and stator causing contact or misalignment.

Figure 4B:
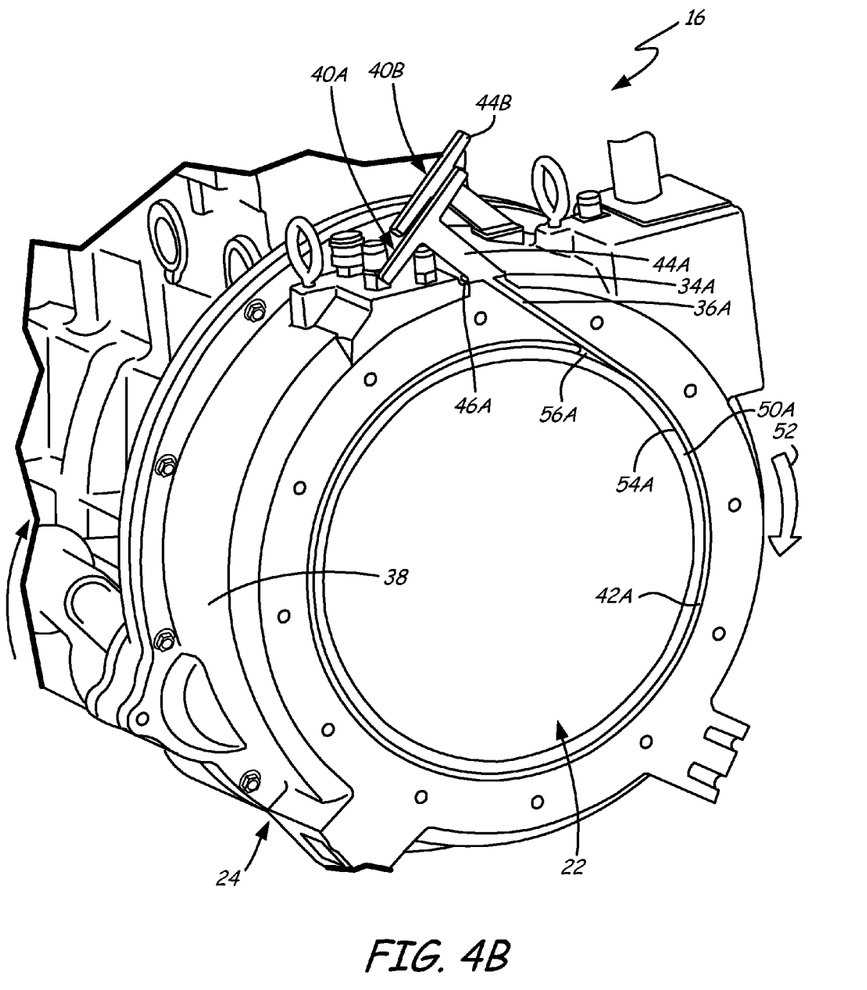
FIG. 4B shows a first radial cross-section of the assembly in FIG. 4A.

FIG. 4B is a first radial cross-section of driveline 10 taken through line 4B in FIG. 4A. Driveline 10 includes prime mover 12 and permanent magnet motor/generator 16. Motor/generator 16 has rotor subassembly 22, stator subassembly 24, permanent magnets 28, stator 30, fixture band 40A, cable 42A, handle 44A, locking plate 46A, rotor guide bracket 50A, directional arrow 52, circumferential track 54A, and first junction 56A.

This cross-section is taken proximate permanent magnet motor/generator 16 and first fixture band 40A closest to gearbox 14 (shown in FIG. 3A). As described above, fixture band 40A is installed into circumferential track 54A by inserting flexible cable 42A through orifice 36A at portal 34A on stator casing 38. Fixture band 40A is fed into motor/generator 16 by inserting and sliding cable 42A in direction 52 until substantially the entire length of cable 42 is within circumferential track 54A between rotor subassembly 22 and stator subassembly 24.

Circumferential track 54A is the path by which cable 42A is guided and retained. In this example, track 54A is defined by two guide brackets, one each on rotor subassembly 22 and stator subassembly 24. Generally, the guide brackets include a portion of track 54A that corresponds to part of the shape of fixture band 40A. As will be seen below, when rotor magnets 28 and stator 30 are coaxially aligned, the guide brackets line up such that the two track portions define track 54A. The edge of rotor guide bracket 50A is visible in FIG. 4B, but can be seen in more detail, along with the stator guide bracket, in FIG. 4D.

Orifice 36A provides a path for communication between portal 34A on stator casing 38 and track 54A (at junction 56A) located between rotor subassembly 22 and stator subassembly 24. Junction 56A is the point at which cable 42A goes from orifice 36A into track 54A. In this example, orifice 36A is arranged substantially tangential to circumferential track 54A at junction 56A. It should be noted that orifice 36A need not be precisely tangential to track 54A, and may even be slightly curved. However, it will be apparent that too much curvature in orifice 36A can result in problems with feeding cable 42A into and around curved track 54A.

Here, the length of cable 42A is substantially equivalent to the combined length of track 54A and orifice 36A such that the end of cable 42A without handle 44A sits near junction 56A. Thus when fixture band 40A is properly sized and installed, handle 44A and locking plate 46A sit flush against portal 34A and can be secured to stator casing 38 by bolts 48A.

Figure 4C:
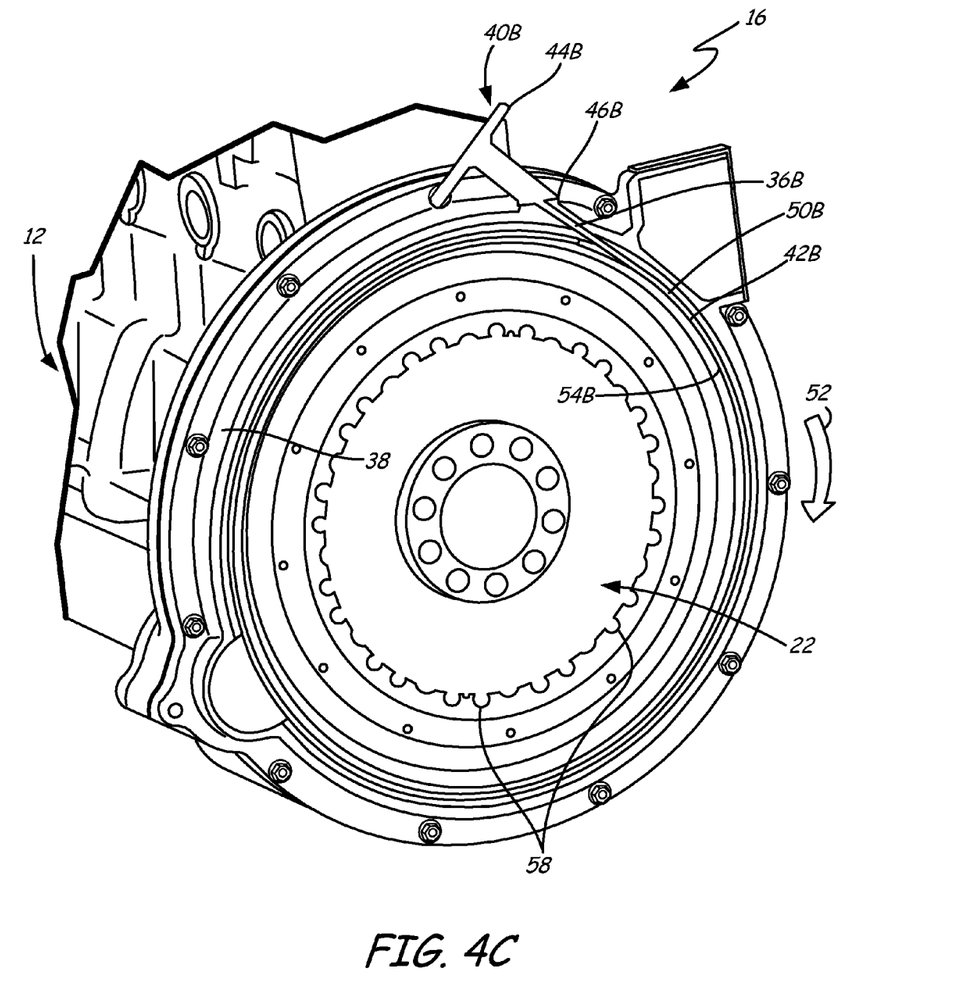
FIG. 4C shows a second radial cross-section of the assembly in FIG. 4A.

FIG. 4C is a second cross-section of driveline 10 taken radially through line 4C in FIG. 4A. Driveline 10 includes prime mover 12 and permanent magnet motor/generator 16. Permanent magnet motor/generator 16 includes rotor subassembly 22, stator subassembly 24, orifice 36B, fixture band 40B, handle 44B, locking plate 46B, second circumferential track 54B, second junction 56B, and stator winding slots 58. Stator windings have been removed from slots 58 to better illustrate other elements in the figure.

This radial cross-section is taken across permanent magnet motor/generator 16 to show fixture band 40B, which is positioned closer to prime mover 12. As described above, fixture band 40B is installed into circumferential track 54B by inserting flexible cable 42B into orifice 36B at portal 34B on stator casing 38. Fixture band 40B is fed into motor/generator 16 by inserting and sliding cable 42B in direction 52 until substantially the entire length of cable 42B is within circumferential track 54B.

Like track 54A, circumferential track 54B is the path by which cable 42B is guided and retained between rotor subassembly 22 and stator subassembly 24. Track 54B is also defined by two guide brackets, one each on rotor subassembly 22 and stator subassembly 24. The edge of rotor guide bracket 50B is visible in FIG. 4C, but can be seen in more detail, along with the stator guide bracket, in FIG. 4D.

Orifice 36B provides a path for communication between portal 34B on stator casing 38 and track 54B (at junction 56B) located between rotor subassembly 22 and stator subassembly 24. Junction 56B is the point at which cable 42B goes from orifice 36B into track 54B. Again, orifice 36B is arranged substantially tangential to junction 56B on circumferential track 54B. Similarly, orifice 36B need not be precisely tangential to track 54B, and may even be slightly curved. However, it will be apparent that too much curvature in orifices 36A (in FIG. 4B) or 36B can cause problems with fully feeding cables 42A, 42B into tracks 54A, 54B.

Like cable 42A, the length of cable 42B is substantially equivalent to the combined length of track 54B and orifice 36B. When installed, the end of cable 42B without handle 44B should sit near junction 56B when handle 44B and locking plate 46B sit flush against portal 34B. Band 40A can then be secured to stator casing 38 at portal 34B by bolts 48B.

Figure 4D:
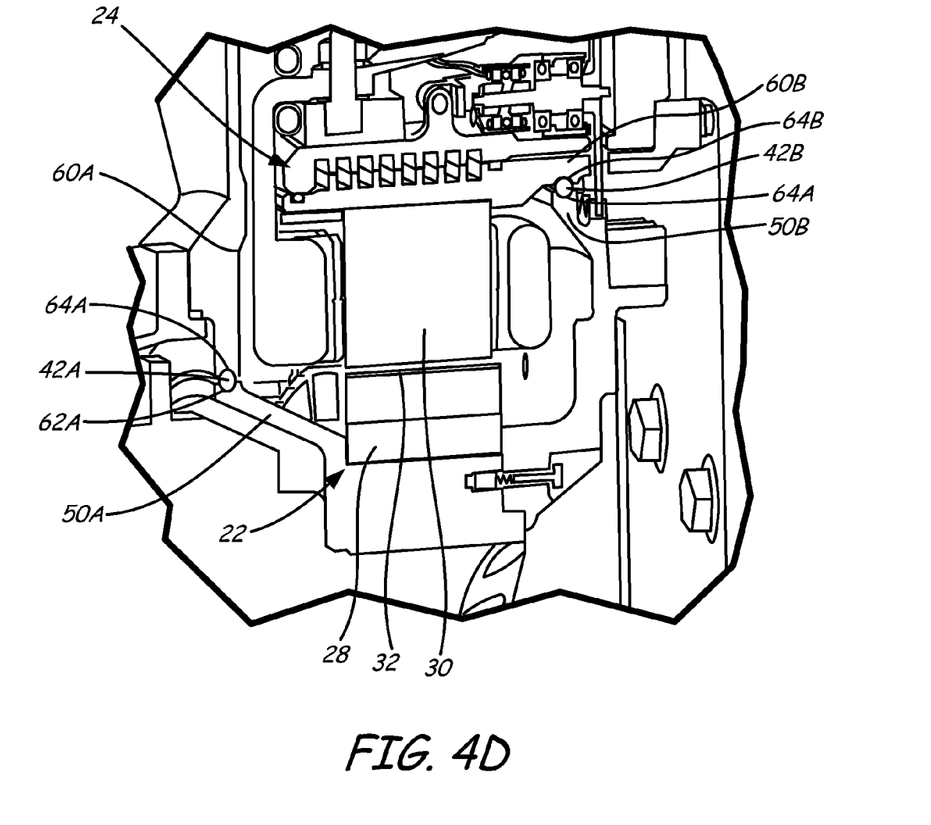
FIG. 4D is an axial cross-section showing placement of the fixture bands relative to the rotor and the stator.

As will be seen more clearly in FIG. 4D, bands 40A, 40B are positioned in tracks 54A, 54B located on either axial side of rotor magnets 28 and stator 30. This can be seen in part in FIG. 4C with the removal of stator 30, revealing that track 54B is disposed adjacent to stator winding slots 58.

FIG. 4D is a detailed axial cross-section of a portion of permanent magnet motor/generator 16. The figure includes rotor magnets 28, stator 30, air gap 32, cables 42A, 42B, rotor guide brackets 50A, 50B, circumferential tracks 54A, 54B, stator guide brackets 60A, 60B, rotor track portions 62A, 62B, and stator track portions 64A, 64B.

As was seen in FIGS. 4A-4C, cables 42A, 42B are disposed on opposing axial sides of rotor magnets 28 and stator 30. In this example, both circumferential tracks 54A, 54B are partly defined by rotor guide brackets 50A, 50B and stator guide brackets 60A, 60B. In this example, there are half circle tracks 62A, 62B on rotor guide brackets 50A, 50B, located on either side of rotor magnets 28. There are also half circle tracks 64A, 64B on stator guide brackets 60A, 60B. These respective track portions 62, 64 encompass round cables 42A, 42B around substantially the entire circumference of motor/generator 16.

This arrangement of fixture bands with cables 42 in tracks 54 helps prevent both axial and radial displacement of rotor subassembly 22 relative to stator subassembly 24. It also prevents and minimizes damage by helping to react the magnetic forces between magnets 28 and stator 30. During insertion into tracks 54A, 54B, cables 42A, 42B can also be under slight compression, to improve retention of bands 40 and to improve absorption of the relative motion between rotor subassembly 22 and stator subassembly 24. And they can be used in virtually any position in the driveline due to the tangential access provided through the stator casing as described above. Bands 40 are thus effective throughout transport, storage, and installation of permanent magnet motor/generator 16.

While bands 40A, 40B are circular in FIG. 4D, it will be recognized that other complementary shapes of the cable and track are also possible without departing from the scope of the invention. For example, different shapes of cables 42A, 42B can be arranged to match complementary tracks 54A, 54B. One alternative example of a complementary cable and track pair is shown in FIGS. 5A and 5B.

Two bands 40A, 40B are often used on either side of rotor 28 and stator 30 to prevent contact between them. During assembly and transportation, bending forces are likely to be relatively high, and it is difficult to maximize alignment between rotor subassembly 22 and stator subassembly 24 without them coming into contact.

While FIGS. 3A-3B and 4A-4D all illustrate two fixture bands, only one band is required in certain circumstances. For example, where the magnetic attraction between rotor magnets 28 and stator 30 is relatively small, their axial width is relatively small compared to the cross-sectional area of the cable, or the air gap is relatively large, the risks of magnets 28 and stator 30 coming into contact are relatively minor except when high bending or vibratory stresses are applied. When the band is also larger and more resilient, such as is shown in FIGS. 5A and 5B, only one such band may be required.

Figure 5A:
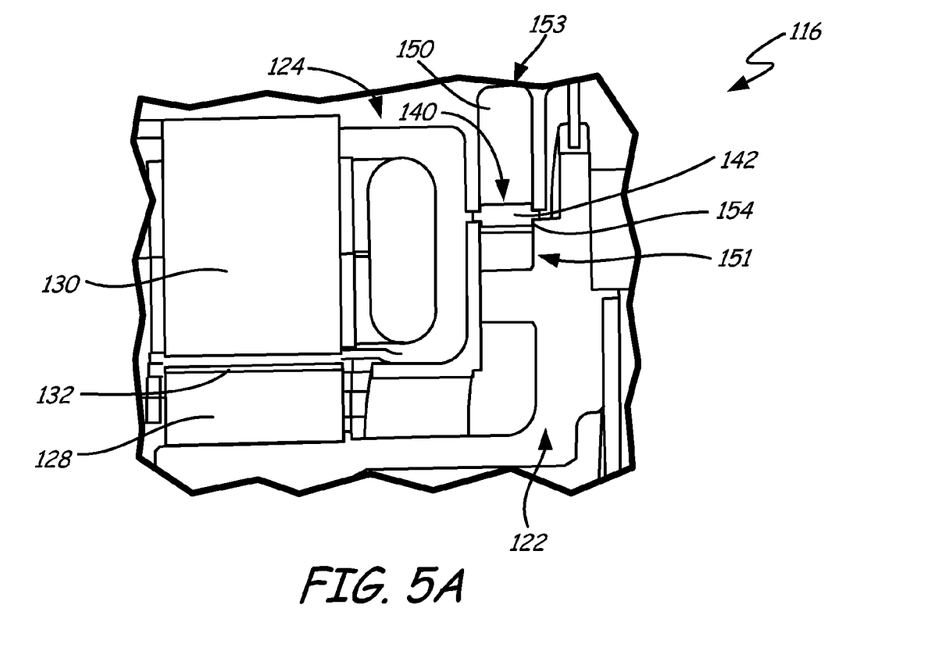
FIG. 5A is a cross-section of alternative rotor and stator assembly having an alternative fixture band disposed in the fan volute.
Figure 5B:
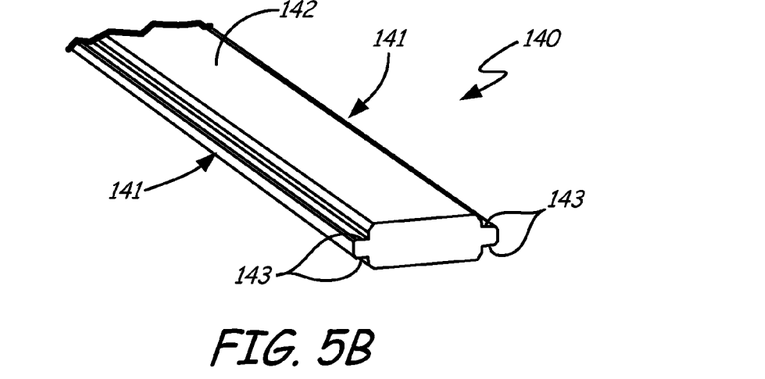
FIG. 5B is a cross-section of the alternative fixture band installed in FIG. 5A.

FIG. 5A is an axial cross-section of alternative permanent magnet motor/generator 116. Motor/generator 116 has rotor subassembly 122, stator subassembly 124, rotor magnets 128, stator 130, air gap 132, alternative fixture band 140 with cable 142, along with fan volute 150.

As in the previous example embodiment, motor/generator 116 has two main parts, rotor subassembly 122 arranged coaxially with stator subassembly 124. Rotor magnets 128 are coaxially adjacent to stator 130 and separated by air gap 132. In this alternative example embodiment, motor/generator 116 also includes fan volute 150 having rotor portion 151 and stator portion 153 along with track 154.

Certain types of permanent magnet motor/generators include an integrated fan to improve cooling of the rotor and/or stator during operation. These are used, for example, when motor/generator 116 is capable of generating or using high levels of current, which requires substantial airflow to facilitate cooling of stator 130. The fan includes fan volute 150 located axially adjacent to stator 130. Fan volute 150 is defined by rotor portion 151 and stator portion 153. This is similar to the location of bracket 50A shown in FIG. 4D. Ordinarily, in motor/generators without fans, this space is part of the air gap around the stator.

When motor/generator 116 is being assembled, transported, or installed into a driveline, rotor subassembly 122 is not rotating and fan volute 150 is effectively empty space. A portion of this space can double as circumferential track 154 for band 140, as shown in FIG. 5A. This is similar to tracks 54A, 54B in FIGS. 4A-4D. Band 140 has cable 142 with a cross-section complementing the shape of track 154 to take advantage of that empty space. When installed in volute 150 as shown in FIG. 5A, band 140 secures rotor subassembly 122 relative to stator subassembly 124 and prevents undesired axial and radial movement as described above.

Cable 142 can be a flexible non-ferrous metal, which is more resilient than a resin-based cable. This more complex design and larger cross-section of track 154 allows for a single band 140 to be placed in fan volute 150, as compared to two bands 40 with round cables 42 (shown in FIG. 4D). The more complex geometry, larger size, and more resilient material of band 140 improves contact with rotor subassembly 122 and stator subassembly 124 as compared to bands 40A, 40B shown in FIGS. 4A-4D. Fan volute 150 is also accessed by a portal in the casing similar to portals 34. It will be apparent that the portal and orifice for motor/generator 116 will not be round but instead will be shaped to complement the cross-section of cable 142.

FIG. 5B shows a cross-section of fixture band 140 having cable 142 with corners 141 and cutouts 143. Band 140 is an alternative embodiment of fixture bands 40A, 40B shown in FIG. 3B. This cross-section is generally rectangular with square cutouts 143 on each corner 141. This allows band 140 to fit securely into fan volute 150 as shown in FIG. 5A.

Thus far, the invention has been described relative to an example of a permanent magnet motor/generator being installed into a driveline of a ground-based vehicle. It has also been described using the example of the motor/generator being installed into the center of a driveline. However, it should be noted that this specification should not be read to limit the claims to these example embodiments. A permanent magnet motor/generator according to the above descriptions can be installed at the end of a driveline without affecting the purpose or utility thereof. Similarly, it is not limited to application in ground-based vehicles. For example, in addition to stand-alone electric machines, other electric motor applications use a permanent magnet motor/generator or other similar apparatus as part of a larger electromagnetic generator assembly. In one instance, a ram air turbine generator for an aircraft utilizes a permanent magnet motor/generator to generate exciter current, which is later applied to power an electromagnetic main rotor. The features described can be readily modified for the permanent magnet motor/generator section of the ram air turbine generator during assembly, transport, and/or installation.

The features shown and described in the specification can also be adapted to apply to any type of electric machine (e.g., induction, switched reluctance, wound field, etc.). It will also be appreciated that they can be used in applications other than electric machines. For example, any type of rotating hardware that doesn't have its own support bearings, such as a turbine or compressor section of a gas turbine engine, can be adapted to include one or more fixture bands. The bands can be used in a similar manner to retain the rotor section before the bearingless component is integrated with its permanent support structure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A rotating machine comprising:
   a stationary subassembly including a casing and a plurality of stator elements disposed proximate an inner circumference of a portion of the stationary subassembly, the casing having a first portal;
   a rotating subassembly including a plurality of rotor elements disposed proximate an outer circumference of a portion of the rotating subassembly, the rotating subassembly aligned coaxially within the stationary subassembly and adapted to be rotatable relative to the stationary subassembly without the aid of mechanical support bearings; and
   a first circumferential track defined by a first rotor track portion on the rotating subassembly and a first stator track portion on the stationary subassembly, the first circumferential track in communication with the first portal;
   wherein the first rotor track portion and the first stator track portion are defined by a fan volute.
2. The rotating machine of claim 1, further comprising a first fixture band including a first flexible cable for insertion into the first track via the first portal, wherein the fixture band substantially prevents physical contact between coaxially adjacent rotor elements and stator elements by minimizing axial and radial displacement of the rotating subassembly relative to the stationary subassembly.
3. The rotating machine of claim 2, wherein the first cable is coated with at least one layer of polytetrafluoroethylene ("PTFE").
4. The rotating machine of claim 2, wherein the first cable has a uniform cross-section substantially identical to a cross-section of the first circumferential track.
5. The rotating machine of claim 2, wherein the first fixture band includes a plate for securing the first fixture band to the casing.
6. The rotating machine of claim 1, wherein the first circumferential track is in communication with the first portal via a first orifice extending tangentially between the first portal and the first circumferential track.
7. The rotating machine of claim 1, wherein the stationary subassembly is a stator subassembly for an electric machine and the rotating subassembly is a rotor subassembly for an electric machine.
8. The rotating machine of claim 7, wherein the electric machine is selected from one of: a permanent magnet machine, an induction machine, a switched reluctance machine, and a wound field machine.
9. A driveline for a motor vehicle, the driveline comprising:
   a prime mover;
   a gearbox; and
   a bearingless rotating machine rotatably coupled to the gearbox and the prime mover, the bearingless rotating machine comprising:
      a stationary subassembly including a casing and a plurality of stator elements disposed proximate an inner circumference of a portion of the stationary subassembly, the casing having a first portal;
      a rotating subassembly including one or more rotor elements disposed proximate an outer circumference of a portion of the rotating subassembly, the rotating subassembly aligned coaxially within the stator subassembly and adapted to be rotatable relative to the stationary subassembly without the aid of mechanical support bearings;
      a first circumferential track defined by a first rotor track portion on the rotating subassembly and a first stator track portion on the stationary subassembly, the first circumferential track in communication with the first portal, the rotor track portion and the stator track portion defined by a fan volute; and
      a first removable fixture band for insertion into the first track via the first portal;
      wherein insertion of the fixture band into the first circumferential track substantially prevents physical contact between the one or more rotor elements and the stator elements by minimizing axial and radial displacement of the rotor subassembly relative to the stator subassembly.
10. The driveline of claim 9, wherein the bearingless rotating machine is an electric machine.
11. A rotating machine comprising:
    a stationary subassembly including a casing a plurality of stator elements disposed proximate an inner circumference of a portion of the stationary subassembly, the casing having a first portal;
    a rotating subassembly including a plurality of rotor elements disposed proximate an outer circumference of a portion of the rotating subassembly, the rotating subassembly aligned coaxially within the stationary subassembly and adapted to be rotatable relative to the stationary subassembly without the aid of mechanical support bearings;
    a first rotor guide bracket extending circumferentially around the rotating subassembly, the first rotor guide bracket including a first rotor track portion facing the stationary subassembly; and
    a first stator guide bracket extending circumferentially around the stationary subassembly, the first stator guide bracket including a first stator track portion facing the rotating subassembly;
    wherein the first rotor track portion and the first stator track portion define a first circumferential track adapted to receive a fixture band via the first portal.
12. The rotating machine of claim 11, further comprising:
    a second circumferential track defined by a second rotor track portion on the rotating subassembly and a second stator track portion on the stationary subassembly, the second circumferential track in communication with a second portal on the casing via a second orifice extending tangentially between the second portal and the second circumferential track.
13. The rotating machine of claim 12, further comprising a second removable fixture band including a second cable for insertion into the second circumferential track.
14. The rotating machine of claim 13, wherein the second cable has a substantially uniform cross-section.
15. The rotating machine of claim 11, further comprising a first fixture band including a first flexible cable for insertion into the first track via the first portal, wherein the fixture band substantially prevents physical contact between coaxially adjacent rotor elements and stator elements by minimizing axial and radial displacement of the rotating subassembly relative to the stationary subassembly.
16. The rotating machine of claim 15, wherein the first cable has a uniform cross-section substantially identical to a cross-section of the first circumferential track.
17. The rotating machine of claim 16, wherein the cross-section of the first circumferential track is circular, defined by a half-circle rotor track portion and a half-circle stator track portion.
18. The rotating machine of claim 11, wherein the first circumferential track is disposed on a first axial side of the plurality of rotor elements.

19. The rotating machine of claim 11, wherein the stationary subassembly is a stator subassembly for an electric machine and the rotating subassembly is a rotor subassembly for an electric machine, the electric machine selected from one of: a permanent magnet machine, an induction machine, a switched reluctance machine, and a wound field machine.

\* \* \* \* \*